Oct. 10, 1967  H. LIST  3,346,242
MIXING MACHINE
Filed Aug. 9, 1966  3 Sheets-Sheet 1

INVENTOR
HEINZ List
BY Jacobi & Davidson
His Attorney

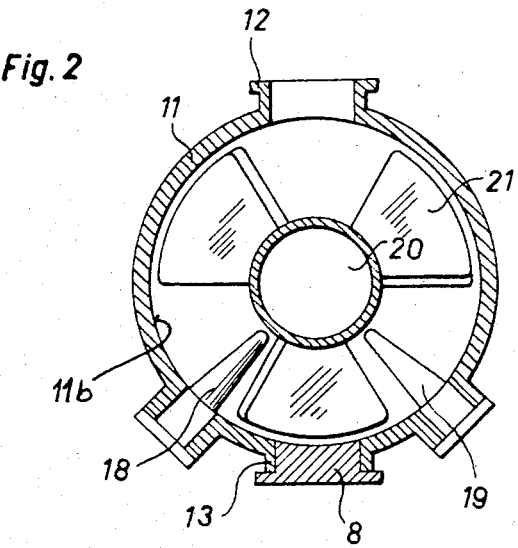
Fig. 2
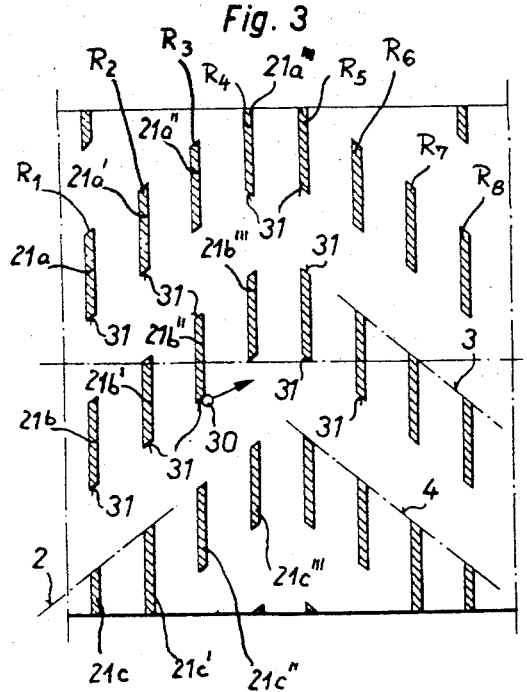
Fig. 3
Fig. 4 PRIOR ART
INVENTOR
HEINZ LIST
BY Jacobi & Davidson
His Attorney Oct. 10, 1967  H. LIST  3,346,242
MIXING MACHINE
Filed Aug. 9, 1966  3 Sheets-Sheet 3

INVENTOR
HEINZ List
BY Jacobi & Davidson
His Attorney

United States Patent Office 3,346,242
Patented Oct. 10, 1967

3,346,242
MIXING MACHINE
Heinz List, St. Jakobstrasse 43, Pratteln, Switzerland
Filed Aug. 9, 1966, Ser. No. 571,207
Claims priority, application Switzerland, Aug. 14, 1965,
11,570/65
10 Claims. (Cl. 259—111)

ABSTRACT OF THE DISCLOSURE

A mixing machine for mixing material including an internal carrier means provided with a plurality of mixing elements, the mixing elements being segmented disc-shaped parts of a plurality of interrupted discs which are bodies of rotation, the radial axes of the segmented parts of each individual interrupted disc lying substantially in the same plane. The mixing elements of each interrupted disc are further arranged in circumferential offset to the mixing elements of the neighboring interrupted disc, the end faces of the mixing elements being oriented substantially along at least one helical line. An external housing is provided with kneading teeth means projecting internally thereof. Included are drive means for imparting a relative rotational movement between the carrier means and the housing as well as an axially oscillating movement between the kneading teeth means and the mixing elements.

---

The present invention has reference to an improved mixing machine for the mixing of materials and is of the type comprising an external housing and at least one carrier means or support arranged internally of the housing for mixing elements, which may be in the form of segmented disc-shaped members. Additionally, the inventive mixing machine incorporates kneading teeth extending into the interior of the housing and which may be secured to the aforesaid housing, and wherein, the carrier means and housing carry out a relative rotational movement, and the aforesaid carrier means may also partake in axially oscillating or reciprocatory motion for the purpose of mutually cleaning the kneading teeth and the mixing elements.

The majority of mixing machines used nowadays have tools which only rotate. On the other hand, a machine is known, the tools of which are constructed as impeller or vane worm means which rotates and axially oscillates. Due to this oscillatory motion, it is possible for the vane worm means with its spaces between the vanes to pass the kneading teeth secured in the housing without blocking. These spaces or gaps of the helical line considerably reduce the heat transfer surfaces of the machine. This oftentimes makes it more difficult to carry out thermal processes. Further, with such machine the rotational and axially oscillating movements are positively coupled and must work in synchronism. Accordingly, for this purpose a relatively expensive drive is necessary.

Furthermore, as partially shown in FIGURE 4 a machine serving as heat exchanger is also known to the art, in which a shaft is equipped with a number of radial disc-shaped segments which likewise rotate and axially oscillate, the disc-shaped segments, in each instance, being cleaned by the teeth secured in the housing. Here, the largest part of the axial oscillatory movement is limited by the axial spacing of the kneading teeth and can take place completely independent of the rotational movement. However, the mixing and kneading action in such machine is relatively small. This is so because the conveying of the material within the housing for the purpose of mixing, owing to the arrangement of the segmented discs and the gaps in axially parallel line, only is carried out by means of the beveled or tapered portions of very small end faces or surfaces of the segmented discs which function as work surfaces.

Accordingly, it is a primary object of the present invention to provide an improved mixing machine which affords a better mixing action.

Another important object of this invention is the provision of an improved mixing machine which ensures for a thorough and complete mixing of the material while also providing large heat transfer surfaces.

Still a further noteworthy object of the present invention relates to the construction of an improved mixing machine which is relatively simple and economical in construction, provides for an extremely good mixing of the material, is not readily subject to breakdown or clogging, conveys the material through the machine with a minimum of effort, and generally guarantees for thorough, reliable and trouble-free mixing of most types of materials.

In order to achieve these and still further objects of the present invention, the new and improved mixing machine is generally characterized by the features that the mixing elements are spaced and offset from one another upon the carrier in such a manner that their end faces are situated along at least one helical line or helix. It has been found that with a uniform power requirement and large heat transfer surfaces it is possible to achieve a very good mixing and kneading effect if the conveying or transport action of the discs is considerably improved through the arrangement of the working edges along a helical line or helix.

The invention will be better understood, and objects other than those set forth above, will become apparent, when consideration is given to the following detailed description thereof. Such description makes reference to the annexed drawings wherein:

FIGURE 2 is a cross-sectional view taken through the kneader or mixing machine of FIGURE 1;

FIGURE 3 is a development of the mixing or agitator shaft of the machine of FIGURES 1 and 2 and provided with segmented discs arranged along a helix or helical line;

FIGURE 4 is a development of a known, prior art agitator or mixing shaft with the segmented discs located in the known coaxial arrangement;

Figure 1:
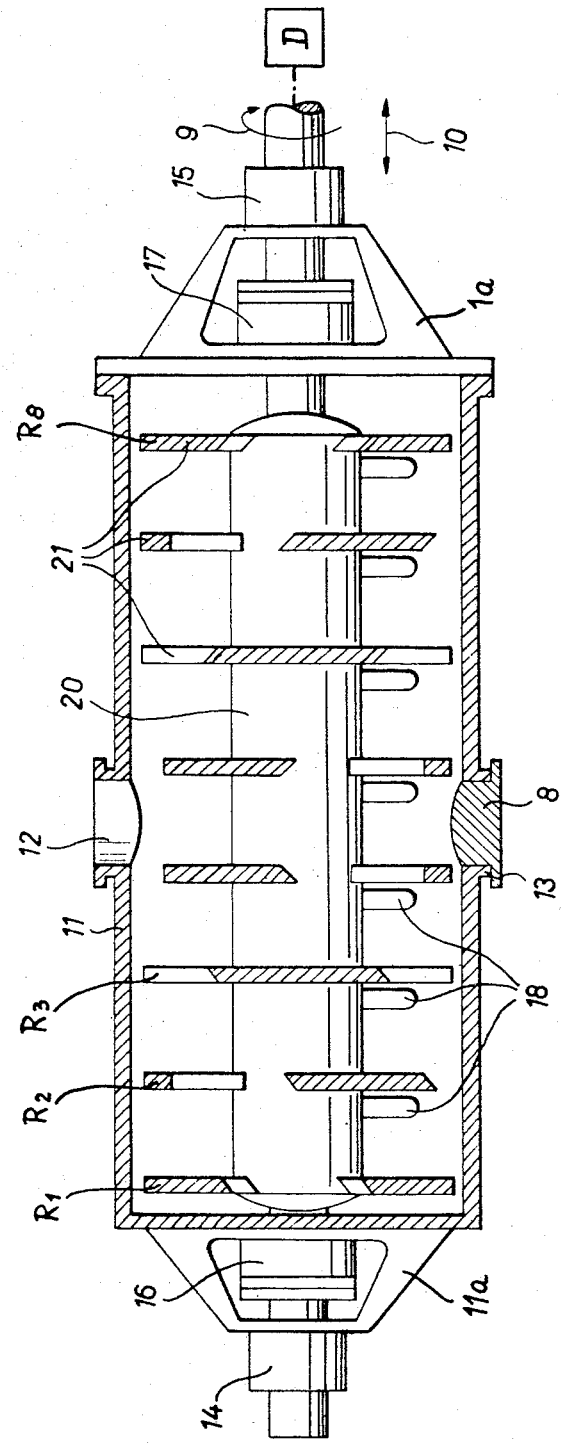
FIGURE 1 is a longitudinal sectional view through a batch kneader with a cylindrical housing.

Describing now the drawings, it will be understood that in FIGURES 1 and 2 there is depicted an exemplary embodiment of inventive mixing machine, here shown as a batch kneader. It is to be understood that a shaft 20 rotates, for instance in the direction of the arrow 9, within a cylindrical housing 11 having an infeed opening 12 and a discharge opening 13. A number of mixing elements, here shown as plate or disc segments 21 are mounted upon the rotatable shaft 20. The outlet or discharge opening 13 is closed by means of a cover member 8 or any other suitable expedient. Both of the ends of the rotatable shaft 20 are supported in bearings 14 and 15 respectively, and their passage through the housing cover means 11a is sealed by means of the stuffing or packing boxes 16 and 17 respectively. It may also be seen that in the housing 11 there are arranged two rows of kneading teeth 18 and 19 which extend or project into the interior of the aforesaid housing 11, as best seen by referring to FIGURE 2, and in this embodiment are affixed to the inner housing wall 11b.

A suitable drive or drive arrangement, generally indicated by reference character D, imparts rotational movement to the shaft 20. Drive means 20 also superimposes upon the rotatable shaft 20 an axially oscillating or reciprocatory movement in the direction of the double-headed arrow 10, so that the segmented discs 21 or the like bear once at the left and another time at the right of the kneading teeth 18 and 19 and thereby are always scraped clean by such. However, owing to this oscillatory movement the material between the segmented discs 21 and the kneading teeth 18, 19 is simultaneously kneaded and mixed. By providing an appropriate construction of the kneading teeth 18, 19 this kneading effect can be increased if, for instance, between each segmented disc and a neighboring kneading tooth there is provided a wedge-shaped space or compartment in which the material is subjected to particularly great shearing forces according to the law of a roller gap or space. In addition to this local kneading effect, there is also achieved feeding or transport of the material throughout the entire area of the kneader by arranging the segmented discs 21 along a helical line or helix. In order to more fully understand this construction, in FIGURE 3 there is depicted a development of the outer cylindrical surface of the agitator or mixing unit 20, 21 of FIGURES 1 and 2. It will be recognized that the segmented disc-shaped mixing elements 21 are depicted therein with hatched lines.

To provide a comparison therewith, a similar development of a known, coaxial arrangement of segmented discs 5 is depicted in FIGURE 4. With regard to this figure, let it be assumed that in FIGURE 4 reference numeral 7 represents a particle of material which is to be kneaded and which has arrived at a forward, beveled end face or surface 6 of a given segmented disc member 5. It should then be apparent that this material particle 7 will be deflected towards the right of the figure. Once it has moved away from the beveled or inclined end face 6, then the only axial transport force which remains is the pressure of the other material to be kneaded which likewise is pushed past the end face or surface 6 and the thrust or push which is produced in known manner by a rotating and axially oscillating agitator or mixing unit. This pressure, the direction of which is schematically depicted in FIGURE 4 by an arrow, with the known coaxial arrangement of the segmented discs, as shown in FIGURE 4, will be taken up very soon by the side faces 5a of the segmented discs 5, and thus the transport movement of the material particle 7 will be interrupted.

Now, however, with the inventive arrangement of the segmented disc-like mixing elements 21, for instance according to FIGURE 3, a material particle 30 can move without obstruction away from one end face or surface 31, in the direction of the therein depicted arrow, into a gap or even directly to the end face 31 of another segmented disc-shaped mixing element 21, so that an intensive and rapid, axial mixing of the material takes place. In this regard, the end faces or surfaces 31 are situated along a number of helical lines or helixes, as will be more fully developed shortly. The helical lines 3 and 4 are for instance in parallelism with one another and the helical lines 2 and 4 form an arrowhead.

To more fully appreciate the arrangement of the segmented disc-shaped mixing elements 21, as conveniently represented in the development of the mixer unit 20, 21 depicted in FIGURE 3, these mixing elements 21 can be considered to be arranged in spaced rows $R_1$, $R_2$, $R_3$ . . . $R_7$, $R_8$, $R_n$ axially along the support or carrier means 20. Each such row of mixing elements 21, such as the row $R_1$ for instance is composed of a plurality of spaced segmented disc-like mixing elements, here identified by reference characters 21a, 21b, 21c. Moreover, when considering the rows $R_1$, $R_2$, $R_3$ and $R_4$ for instance, it will be recognized that the neighboring, confronting segmented disc-like mixing elements, such as the group bearing reference characters 21a, 21a', 21a'', 21a''', or the group 21b, 21b', 21b'', 21b''', or the group 21c, 21c', 21c'', 21c''', are circumferentially offset with respect to one another. As a result, the working or end faces 31 or the mixing elements 21 of any given aforesaid group are arranged along a line, specifically what may be considered a helical line or helix, such as the one identified by reference numeral 2 in FIGURE 3. This line 2 advantageously forms an acute angle with the longitudinal axis or the plane containing the longitudinal axis of the support or carrier means 20, and preferably an angle of about 45°. It will be also understood that the rows $R_5$, $R_6$, $R_7$, $R_8$ have an analogous arrangement of their segmented disc-like mixing elements 21, as just considered with respect to the rows $R_1$, $R_2$, $R_3$ and $R_4$; however, in this case the line passing through the working or end faces 31 of the aforesaid mixing elements of any given group is oppositely inclined, for instance as best seen by the lines 3 and 4 at the right of FIGURE 3. In fact, the helical lines 2 and 4 for instance, can be considered as disposed to opposite sides of a transverse plane taken through the carrier means or support 20, to thereby provide a substantially arrowhead-like configuration of the neighboring, confronting mixing elements 21 of the therein depicted rows $R_1$ to $R_8$.

It has been found that in order to obtain a thorough mixing and kneading of the material, it is advantageous to arrange the segmented disc-shaped mixing elements 21 upon the shaft or carrier means 20 in arrowhead fashion, as shown in FIGURES 1 and 3, so that the material during one direction of rotation of the shaft 20 is conveyed towards the center, and during the other direction of rotation of this shaft towards the outer end walls 11a, and thus is really subjected to a very good tumbling or circulation within the housing 11. With difficult kneading processes a regular reversing of the direction of rotation can be of advantage. In this regard, the drive arrangement D would carry out reversal of the shaft or carrier means 20.

Figure 5:
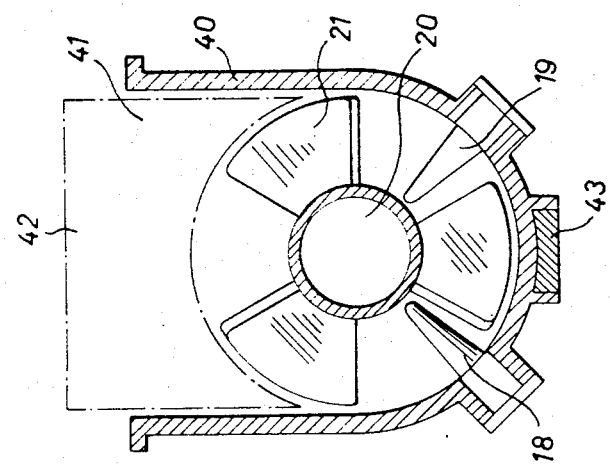
FIGURE 5 is a cross-sectional view of a trough kneader or mixing machine.

The sometimes difficult properties of pasty material which is to be kneaded, makes it necessary to provide large infeed and discharge openings. For this purpose, a trough-shaped configuration of the housing, such as housing 40 shown in FIGURE 5, is advantageous. In this embodiment, in known manner the mass after finishing kneading is emptied towards the bottom by tilting such housing 40. Furthermore, in order to increase the kneading action it would be possible to introduce a press ram or plunger 42, shown in phantom lines, through an upper trough opening 41. It would also be possible to empty the trough housing 40 of FIGURE 5 directly towards the bottom by providing one or more large doors 43, thereby obviating the necessity of tilting. Once again, the segmented disc-shaped mixing elements 21 of this embodiment are again seated upon the shaft or carrier means 20 within the trough housing 40 and the kneading teeth 18 and 19 are affixed to the aforesaid housing.

Figure 6:
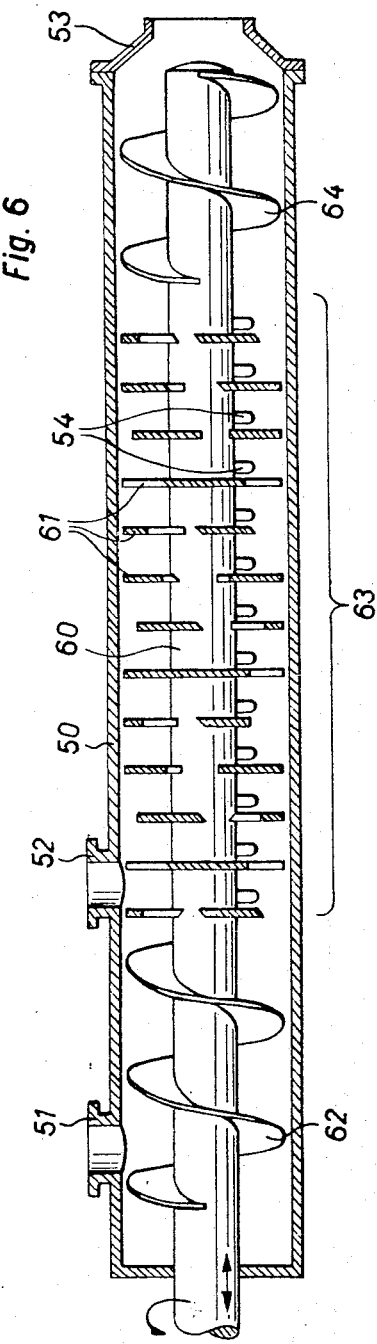
FIGURE 6 is a longitudinal sectional view through a continuous disc kneader or mixing machine.

FIGURE 6 depicts a further embodiment of inventive mixing machine providing for continuous operation. Here, in a housnig 50 having an infeed means 51 and 52 and an open discharge portion 53 is well as the kneading teeth means 54, there is mounted for rotation and axial oscillation a shaft or carrier means 60. Upon the latter there are fastened the segmented, disc-shaped mixing elements 61 arranged in helical or worm-like fashion, as already previously considered. The difficulty in handling the material to be kneaded, oftentimes makes it necessary to appropriately dose the raw material at the inlet 51 into the kneading compartment 63 by means of a special worm means 62, and by means of a special worm means 64 to transport the finished kneaded material out of the kneading compartment 63 into the discharge or outlet 53. These worm means 62 and 64 can also, in known manner, serve to seal the kneading compartment 63 to both sides during gassing or degassing processes. It is also possible to intensify the kneading work carried out in the machine by utilizing certain non-illustrated damming elements which are arranged in the direction of transportation of the material to be kneaded. For instance, to provide such a damming element or means it would be possible to narrow the cross-section of the housing 50, and also to arrange disc elements upon the mixer unit 60, 61 which work against the main transport or feed direction, in other words to the left of FIGURE 6.

In order to preserve clarity in illustration, it will be understood that all of the constructional expedients for the possible heating or cooling of all walls which come into contact with the material to be kneaded have been omitted from the drawings. Inasmuch as such structure does not form any part of the subject matter of this invention, and further since such expedients can be provided in the same manner as with known mixing machines, no further consideration need be given ot these measures.

Finally, it is indicated that a number of variations of the specific exemplary embodiments depicted herein would readily be possible without departing from the teachings and inventive concepts of the present invention. For instance, it would also be possible to impart the rotational and/or the oscillating movement to the housing 11 or 50 or the mixing machine, in which case, then, the shaft 20 or 60 with the segmented mixing elements 21 or 61 respectively, arranged internally of the housing 11 or 50 respectively, would remain at standstill. A further modification is represented by the possibility of constructing a machine where the oscillatory movement is only imparted to the kneading teeth 18, 19 or 54.

In addition to utilizing the inventive mixing machine for pure physical mixing and kneading processes, with or without heat exchange, the inventive mixing machine also has particular significance in its application for reaction processes of the chemical and food industries with liquid, pasty or solid condition of the material to be mixed, the reaction temperature of which requires larger heat exchange surfaces. In this respect, there can also simultaneously be present or removed as the reaction components, gases in vacuum, with or without pressure.

It should therefore be apparent from the foregoing detailed description, that the objects set forth at the outset of the specification have been successfully achieved.

Accordingly, what is claimed is:

1. A mixing machine for mixing material comprising:
an external housing;
at least one carrier means within said housing provided with a plurality of mixing elements, said mixing elements comprising segmented disc-shaped parts of a plurality of interrupted discs which are bodies of rotation, the radial axes of the segmented parts of each individual interrupted disc lying substantially in the same plane, said mixing elements including end faces;
said interrupted discs being arranged in spaced relationship upon said carrier means;
said mixing elements of one interrupted disc being arranged in circumferential offset to said mixing elements of the neighboring interrupted disc, the end faces of said mixing elements being oriented substantially along at least one helical line;
kneading teeth means projecting internally of said housing; and
drive means for imparting a relative rotational movement between said carrier means and said housing as well as an axially oscillating movement between said kneading teeth means and said mixing elements.

2. A mixing machine as claimed in claim 1 wherein said oscillating movement extends in the longitudinal direction of the carrier means a distance limited by the distance of neighboring kneading teeth means whereby there is effected a mutual cleaning of said kneading teeth means and said mixing elements.

3. A mixing machine as claimed in claim 1 wherein said rotational movement is independent from said oscillating movement.

4. A mixing machine as claimed in claim 1 wherein said interrupted discs are located at right-angles to the longitudinal axis of said carrier means, and wherein said end faces of said plurality of mixing elements are oriented along a number of respective helical lines which are substantially parallel with one another so as to provide a transport direction through said housing for the material to be mixed.

5. A mixing machine as claimed in claim 4, wherein said number of helical lines are inclined at an angle of about 45° to planes passing substantially through the longitudinal axis of said carrier means; each of said mixing elements further including side faces, said side faces comprising parts of the side faces of said interrupted discs, said side faces of said mixing elements of each interrupted disc being of the same magnitude such that the distance of each of the parallel helical lines which frame the mixing elements is the same.

6. A mixing machine as defined in claim 1, wherein respective confronting mixing elements of each of said interrupted spaced discs are arranged in a staggered array forming axially of said carrier means a substantially arrowhead-like configuration.

7. A mixing machine for mixing material as defined in claim 1, said drive means periodically reversing the relative rotational movement between said carrier means and said housing.

8. A mixing machine for mixing material as defined in claim 7, wherein said kneading teeth means are secured to said housing, said drive means revolving and oscillating said carrier means.

9. A mixing machine for mixing material comprising:
an external housing;
at least one carrier means provided with mixing elements situated within said housing;
said mixing elements having end faces;
kneading teeth means projecting internally of said housing;
drive means for imparting a relative rotational movement between said carrier means and said housing as well as an axially oscillating movement between said kneading teeth means and said mixing elements, said movements effecting a mutual cleaning of said kneading teeth means and said mixing elements;
said mixing elements being arranged in spaced and offset relationship upon said carrier means such that their end faces are oriented substantially along helical lines, the end face of a number of mixing elements being disposed along a first helical line and the end faces of a number of other mixing elements being disposed along a second helical line, said first and second helical lines being located to opposite sides of a transverse plane taken through said carrier means and converging towards one another such that two transport directions of the material to be mixed within the housing are obtained.

10. A mixing machine for mixing material as defined in claim 9, wherein said first and second helical lines are oriented such with respect to said transverse plane that one helical line is substantially the mirror-image of the other.

References Cited
UNITED STATES PATENTS

| | | | |
|---|---|---|---|
| 216,958 | 7/1879 | Hudson | 259—65 |
| 2,731,247 | 1/1956 | Hudry | 259—97 |
| 3,219,320 | 11/1965 | Sutter | 259—97 |

WALTER A. SCHEEL, *Primary Examiner.*

ROBERT W. JENKINS, *Examiner.*